United States Patent
Uchino et al.

(10) Patent No.: US 9,788,338 B2
(45) Date of Patent: *Oct. 10, 2017

(54) RADIO BASE STATION, ROUTER DEVICE, AND MOBILE STATION

(71) Applicant: NTT DOCOMO, INC., Tokyo (JP)

(72) Inventors: Tooru Uchino, Tokyo (JP); Hideaki Takahashi, Tokyo (JP); Akihito Hanaki, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/655,169

(22) PCT Filed: Dec. 25, 2013

(86) PCT No.: PCT/JP2013/084597
§ 371 (c)(1),
(2) Date: Jun. 24, 2015

(87) PCT Pub. No.: WO2014/104068
PCT Pub. Date: Jul. 3, 2014

(65) Prior Publication Data
US 2015/0334725 A1 Nov. 19, 2015

(30) Foreign Application Priority Data
Dec. 28, 2012 (JP) ................. 2012-288710

(51) Int. Cl.
*H04W 72/10* (2009.01)
*H04W 76/06* (2009.01)
(Continued)

(52) U.S. Cl.
CPC .......... *H04W 72/10* (2013.01); *H04W 36/26* (2013.01); *H04W 72/087* (2013.01);
(Continued)

(58) Field of Classification Search
CPC ..... H04L 47/10; H04L 47/14; H04L 47/2433; H04L 47/2491; H04L 67/322;
(Continued)

(56) References Cited

U.S. PATENT DOCUMENTS 8,543,112 B2 * 9/2013 Fox ...................... H04W 48/02
455/434
2004/0235508 A1 * 11/2004 Uchida ................ H04B 7/2659
455/509
(Continued)

FOREIGN PATENT DOCUMENTS

WO 2009/072825 A2 6/2009
WO 2011/119999 A1 9/2011
(Continued)

OTHER PUBLICATIONS

International Search Report issued in corresponding PCT Application No. PCT/JP2013/084597 dated Apr. 8, 2014 (2 pages).
(Continued)

*Primary Examiner* — Jung Park
(74) *Attorney, Agent, or Firm* — Osha Liang LLP

(57) ABSTRACT

An object of the present invention is to perform appropriate priority control even when tethering is performed. A radio base station eNB of the present invention includes an instruction unit 12 configured to give an instruction to a priority call terminal UE#1 to transmit data through a mobile network when a transmission rate of data from the priority call terminal UE#1 falls below a predetermined threshold value in a state where a low priority call bearer is established between the radio base station eNB and a WiFi router 10.

11 Claims, 3 Drawing Sheets

(a)

(b)

(51) Int. Cl.
  *H04W 72/08* (2009.01)
  *H04W 36/26* (2009.01)
  *H04W 88/04* (2009.01)
  *H04W 88/06* (2009.01)
  *H04M 1/00* (2006.01)
  *H04W 84/12* (2009.01)

(52) U.S. Cl.
  CPC .......... *H04W 76/064* (2013.01); *H04M 1/006* (2013.01); *H04M 2250/06* (2013.01); *H04W 84/12* (2013.01); *H04W 88/04* (2013.01); *H04W 88/06* (2013.01)

(58) Field of Classification Search
  CPC ...... H04L 45/00; H04W 80/04; H04W 28/24; H04W 28/10; H04W 36/0011; H04W 88/08; H04W 36/22
  See application file for complete search history.

(56) References Cited

U.S. PATENT DOCUMENTS

| | | | |
|---|---|---|---|
| 2009/0016267 A1* | 1/2009 | Otsubo | ............. H04L 45/00 370/328 |
| 2011/0176476 A1 | 7/2011 | Tsuruoka | |
| 2012/0263036 A1* | 10/2012 | Barclay | ............. H04L 47/245 370/230 |
| 2013/0142070 A1 | 6/2013 | Matsuo et al. | |
| 2014/0036873 A1* | 2/2014 | Cheng | ............. H04W 36/0022 370/331 |

FOREIGN PATENT DOCUMENTS

| | | |
|---|---|---|
| WO | 2012/035697 A1 | 3/2012 |
| WO | 2012147270 A1 | 11/2012 |

OTHER PUBLICATIONS

Written Opinion issued in corresponding PCT Application No. PCT/JP2013/084597 dated Apr. 8, 2014 (3 pages).

3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).

Office Action issued in the counterpart European Patent Application No. 13867295.1, dated Jul. 22, 2016 (11 pages).

Institute for Information Industry (III); "Discussion on Mobile Relay Architecture for LIPA and SIPTO support"; 3GPP TSG-RAN WG3 #77, R3-121792; Qingdao, China; Aug. 13-17, 2012 (5 pages).

* cited by examiner

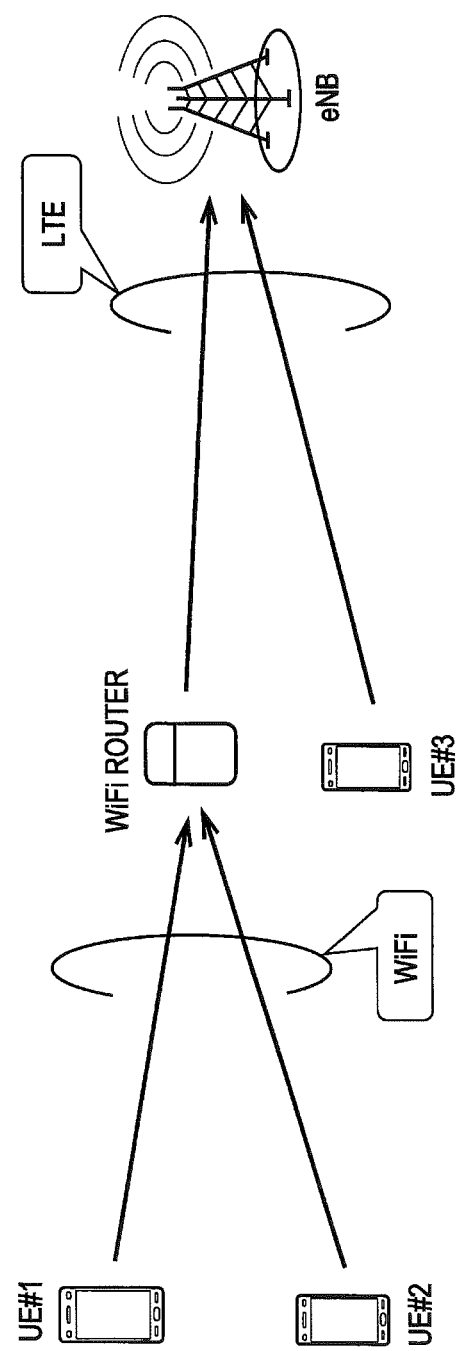

RADIO BASE STATION, ROUTER DEVICE, AND MOBILE STATION

TECHNICAL FIELD

The present invention relates to a radio base station, a router device, and a mobile station.

BACKGROUND ART

An LTE (Long Term Evolution) radio base station eNB is configured to perform scheduling basically based on the priority of a bearer established between the radio base station eNB and a mobile station UE.

Communication using an LTE radio access network as a backhaul line (tethering) is expected to increase due to recent wide spread use of WiFi routers which are router devices for WiFi specified in IEEE 802.11b and due to an increase in transmission rate of data achieved by introduction of "CA (Carrier Aggregation)" (see FIG. 4).

PRIOR ART DOCUMENT

Non-Patent Document

Non-patent document 1: 3GPP TS 36.300 (v11.3.0)

SUMMARY OF THE INVENTION

As shown in FIG. 4, when mobile stations UE are performing tethering, the priority of a bearer established for a WiFi router is uniformly applied to data flowing through the WiFi router. Accordingly, this method has a problem that priority control cannot be performed with distinguishing data transmitted by a priority call terminal UE#1 and data transmitted by a general call terminal UE#2 from each other.

Hence, for example, the following problem may occur. When the priority call terminal UE#1 is performing tethering via the WiFi router establishing a low priority call bearer between the WiFi router and the radio base station eNB, the data transmitted by the priority call terminal UE#1 is scheduled as data with a low priority.

Moreover, the existing radio base stations eNB are not designed to perform priority control while considering contents of received data.

Accordingly, there is a problem that, when the priority of a bearer established between the radio base station eNB and a terminal UE#3 with a priority lower than that of the priority call terminal UE#1 is higher than the priority of the bearer established between the WiFi router and the radio base station eNB, data transmitted by the terminal UE#3 may be handled preferentially over the data transmitted by the priority call terminal UE#1.

The present invention has been made in view of the problems described above, and an object is to provide a radio base station, a router device, and a mobile station which can perform appropriate priority control even when tethering is performed.

A first feature of the present invention is summarized as a radio base station including an instruction unit configured to give an instruction to a terminal with a priority higher than that of a general call terminal to transmit data through a mobile network when a transmission rate of data from the terminal falls below a predetermined threshold value in a state where a low priority call bearer is established between the radio base station and a router device.

A second feature of the present invention is summarized as a router device configured to give an instruction to a terminal with a priority higher than that of a general call terminal to cut-off connection between the router device and the terminal when a transmission rate of data from the terminal falls below a predetermined threshold value in a state where a low priority call bearer is established between the router device and the radio base station.

A third feature of the present invention is summarized as a terminal with a priority higher than a general call terminal. Here, the terminal gives an instruction to a router device to cut-off connection between the terminal and the router device when a transmission rate of data from the terminal falls below a predetermined threshold value in a state where a low priority call bearer is established between the router device and a radio base station.

BRIEF DESCRIPTION OF THE DRAWINGS

FIG. 4 is a view for explaining a conventional art.

DETAILED DESCRIPTION (Mobile Communication System in First Embodiment of Present Invention)

A mobile communication system in a first embodiment of the present invention is described with reference to FIGS. 1 to 3.

Figure 1:
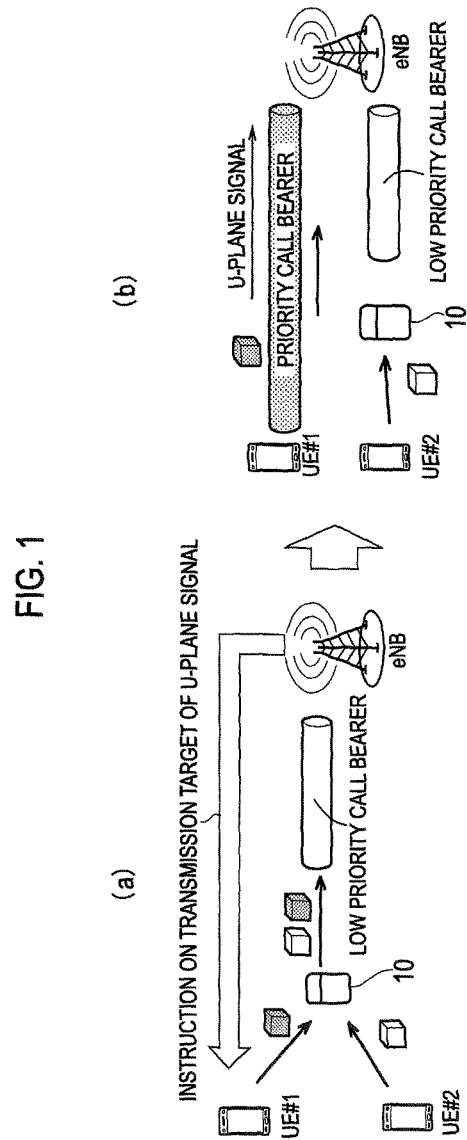
FIG. 1 is an overall configuration diagram of a mobile communication system in a first embodiment of the present invention.

As shown in parts (a) and (b) of FIG. 1, the mobile communication system in the embodiment is a LTE mobile communication system and includes a radio base station eNB, a WiFi router 10, a priority call terminal UE#1, and a general call terminal UE#2.

In the mobile communication system, the priority call terminal UE#1 is a terminal (mobile station) UE with a high priority and the general call terminal UE#2 is a terminal (mobile station) UE with a priority lower than that of the priority call terminal UE#1.

Note that the mobile stations UE may directly notify the WiFi router 10 of the priorities of the respective terminals or may indirectly notify the WiFi router 10 of the priorities via the radio base station eNB.

In the example of part (a) of FIG. 1, a low priority call bearer is established between the radio base station eNB and the WiFi router 10. Meanwhile, in the example of part (b) of FIG. 1, a priority call bearer is established between the priority call terminal UE#1 and the radio base station eNB.

In this example, the priority call bearer is a bearer for transferring high priority data such as data from the priority call terminal UE#1, for example, and the low priority call bearer is a bearer for transferring low priority data such as data from the general call terminal UE#2, for example.

Note that several levels (for example, high, medium, low, very low, and the like) of priorities may be set for the priorities of the bearers established between the radio base station eNB and the WiFi router 10.

In the description, a bearer with a specific level of priority is referred to as the priority call bearer, and a bearer with a level of priority lower than the priority of the priority call bearer is referred to as the low priority call bearer.

Figure 2:
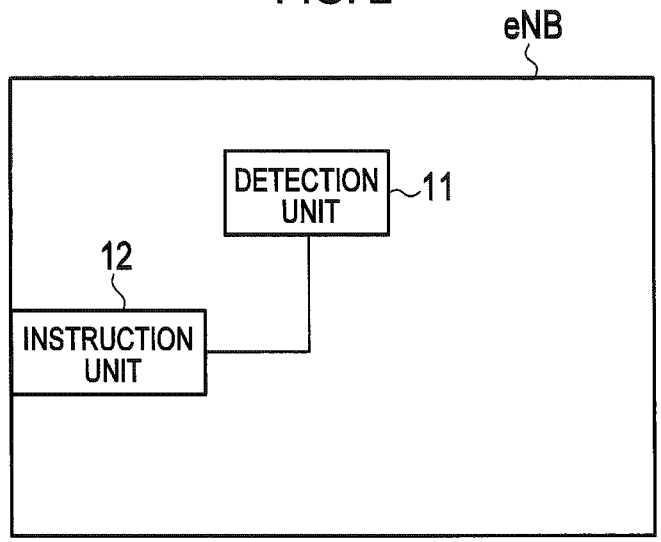
FIG. 2 is a functional block diagram of a radio base station eNB in a first embodiment of the present invention.

As shown in FIG. 2, the radio base station eNB in the embodiment includes a detection unit 11 and an instruction unit 12.

The detection unit 11 is configured to detect a situation where a transmission rate (data rate) of data from the priority call terminal UE#1 falls below a predetermined threshold value (i.e., QoS (Quality of Service) of the data from the priority call terminal UE#1 cannot be guaranteed).

The transmission rate described above may be a mean transmission rate in a predetermined period, a maximum transmission rate in a predetermined period, or a minimum transmission rate in a predetermined period.

The detection unit 11 may be configured to manage the predetermined threshold value for every terminal, for every bearer, or for every "UE category".

Note that the priority call terminal UE#1 or the WiFi router 10 may detect the situation where the transmission rate of the data from the priority call terminal UE#1 falls below the predetermined threshold.

The instruction unit 12 is configured to give an instruction to the priority call terminal UE#1 and the general call terminal UE#2 on a transmission target of data (U-plane signal).

For example, the instruction unit 12 may give an instruction to the priority call terminal UE#1 to transmit data through a mobile network (for example, a LTE or W-CDMA radio access network) when the transmission rate of data from the priority call terminal UE#1 falls below the predetermined threshold value in a state where the low priority call bearer is established between the radio base station eNB and the WiFi router 10 as shown in part (a) of FIG. 1.

Moreover, the instruction unit 12 may give the instruction to the priority call terminal UE#1 to transmit data through the mobile network when the transmission rate of data from the priority call terminal UE#1 falls below the predetermined threshold value in a state where the priority call bearer is established between the radio base station eNB and the WiFi router 10.

The instruction unit 12 may be configured to give the aforementioned instruction through the WiFi router 10 in such a case.

Alternatively, the instruction unit 12 may be configured to give the aforementioned instruction through the mobile network. For example, the instruction unit 12 may be configured to give the aforementioned instruction through the mobile network by using a Paging signal.

Moreover, the instruction unit 12 may be configured to notify the priority call terminal UE#1 of the aforementioned instruction and also required information for performing communication through the mobile network.

For example, broadcast information and individual setting information (Configuration) are assumed to be the required information.

Note that the priority call terminal UE#1 is configured to establish the priority call bearer between the priority call terminal UE#1 and the radio base station eNB through the mobile network as shown in part (b) of FIG. 1 when receiving the aforementioned instruction, and transmit the data (U-plane signal) through the established priority call bearer.

An operation of the mobile communication system in the first embodiment, specifically, the radio base station eNB in the first embodiment is described below with reference to FIG. 3.

Figure 3:
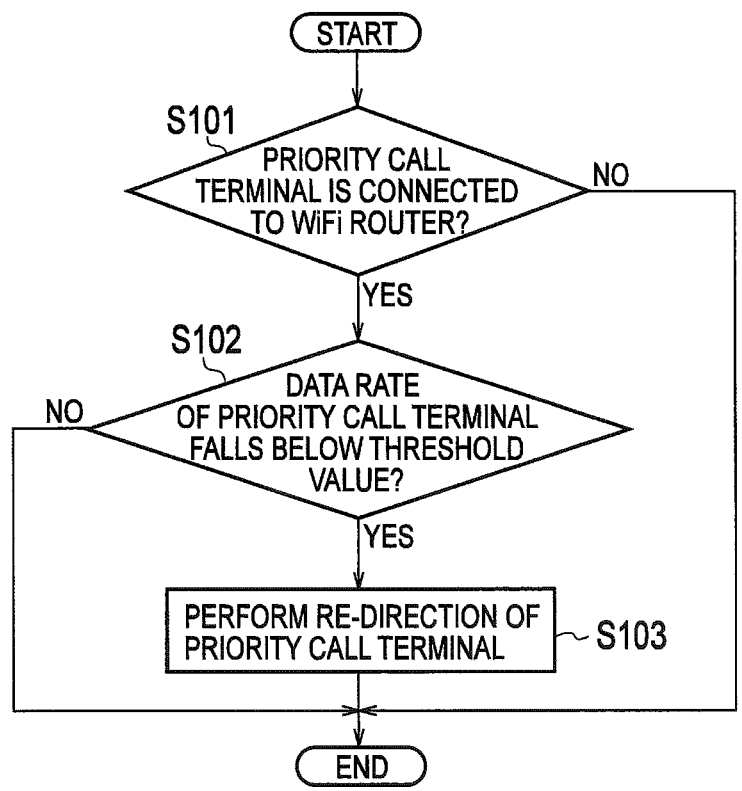
FIG. 3 is a flowchart showing an operation of the radio base station eNB in a first embodiment of the present invention.

As shown in FIG. 3, in step S101, the radio base station eNB determines whether the priority call terminal UE#1 is connected to the WiFi router 10.

If "YES", the operation proceeds to step S102. If "NO", the operation is terminated.

In step S102, the radio base station eNB determines whether the transmission rate of the data from the priority call terminal UE#1 falls below the predetermined threshold.

If "YES", the operation proceeds to step S103. If "NO", the operation is terminated.

In step S103, the radio base station eNB gives an instruction to the priority call terminal UE#1 to transmit data through the mobile network, i.e. gives an instruction to the priority call terminal UE#1 to perform "Re-direction" (i.e. switching of transmission and reception target of the U-plane signal) to the mobile network.

The features of the present embodiment may also be expressed as follows.

A first feature of the present embodiment is summarized as a radio base station eNB including an instruction unit 12 configured to give an instruction to a priority call terminal (terminal with a priority higher than that of a general call terminal UE#2) UE#1 to transmit data through a mobile network when a transmission rate of data from the priority call terminal UE#1 falls below a predetermined threshold value in a state where a low priority call bearer is established between the radio base station eNB and a WiFi router 10 (router device).

In such a configuration, when the transmission rate of the data from the priority call terminal UE#1 performing tethering falls below the predetermined threshold, a transfer path of the data from the priority call terminal UE#1 is changed to the mobile network. This can avoid a decrease in the transmission rate of the data from the priority call terminal UE#1.

In the first feature of the present embodiment, the instruction unit 12 may give the instruction through the WiFi router 10.

In such a configuration, a decrease in the transmission rate of the data from the priority call terminal UE#1 can be avoided by using an existing network configuration.

In the first feature of the present embodiment, the instruction unit 12 may give the instruction through the mobile network.

In such a configuration, a decrease in the transmission rate of the data from the priority call terminal UE#1 can be avoided without increasing the processing load of the WiFi router 10.

In the first feature of the present embodiment, the instruction unit 12 may notify the priority call terminal UE#1 of the instruction and also required information for performing communication through the mobile network.

In such a configuration, the priority call terminal UE#1 can quickly establish the priority call bearer between the priority call terminal UE#1 and the radio base station eNB by using the required information.

In the first feature of the present embodiment, when giving the instruction, the instruction unit 12 may give an instruction to the priority call terminal UE#1 to cut-off connection between the priority call terminal UE#1 and the WiFi router 10.

In such a configuration, unnecessary connection between the priority call terminal UE#1 and the WiFi router 10 can be quickly cut-off.

Moreover, the aforementioned threshold value determination of the transfer rate of the data may be performed in the terminal UE or the WiFi router 10.

When the terminal UE is configured to perform the aforementioned threshold value determination, the terminal UE may be configured to give an instruction to the WiFi router 10 or the radio base station eNB to cut-off the connection between the priority call terminal UE#1 and the WiFi router 10.

When the WiFi router 10 is configured to perform the aforementioned threshold value determination, the WiFi router 10 may be configured to give an instruction to the mobile station UE or the radio base station eNB to cut-off the connection between the priority call terminal UE#1 and the WiFi router 10.

It should be noted that the foregoing operations of the priority call terminal UE#1, the general call terminal UE#2, the radio base stations eNB, and the WiFi router 10 may be implemented by hardware, may be implemented by a software module executed by a processor, or may be implemented in combination of the two.

Moreover, although a case where the present invention is applied to WiFi is given as an example in the aforementioned description, the present invention can be applied to other communication methods (for example, Bluetooth (registered trademark), Transfer Jet (registered trademark), and the like).

Furthermore, although a case where the transfer path is switched from the WiFi router 10 to the mobile network is given as an example in the aforementioned description, the present invention can be applied to a case where the transfer path is switched between other communication methods.

Moreover, the mobile communication system may be configured such that the radio base station eNB or the WiFi router 10 notifies the terminal UE of a RAT (for example, LTE and W-CDMA) of a switching target in a case of giving the aforementioned switching instruction.

When such notification is performed in a LTE mobile communication system, the notification may be performed in any layer such as the RRC layer, the PDCP layer, the RLC layer, the MAC layer, the physical layer, and the like.

Moreover, the terminal UE may be configured to notify the radio base station eNB or the WiFi router 10 which Radio Access Technology (RAT) is capable of being designated as a target to which the connection is to be switched.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the priority call terminal UE#1, the general call terminal UE#2, the radio base stations eNB, and the WiFi router 10. Otherwise, the storage medium and the processor may be provided as discrete components inside the priority call terminal UE#1, the general call terminal UE#2, the radio base stations eNB, and the WiFi router 10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-288710 (filed on Dec. 28, 2012) is incorporated by reference in the present specification.

INDUSTRIAL APPLICABILITY

As described above, the present invention can provide a radio base station, a router device, and a mobile station which can perform appropriate priority control even when tethering is performed.

EXPLANATION OF THE REFERENCE NUMERALS eNB radio base station
UE#1 priority call terminal
UE#2 general call terminal
10 WiFi router
11 detection unit
12 instruction unit

The invention claimed is:

1. A radio base station that is capable of directly connecting with a terminal without connecting through a router device and connecting with the terminal through the router device, the radio base station comprising:
   a processor that detects a situation where a transmission rate of data from a priority call terminal falls below a predetermined threshold value when the priority call terminal connects to the radio base station through the router device using a low priority call bearer; and,
   a transmitter that transmits, to the priority call terminal, an instruction that causes the priority call terminal to transmit data to the radio base station using a priority call bearer when the processor detects the situation,
   wherein the priority call bearer is established between the priority call terminal and the radio base station without connecting through the router device,
   wherein the low priority call bearer is established between the router device and the radio base station,
   wherein the priority call bearer has a higher priority than that of the low priority call bearer, and
   wherein the priority call terminal has a higher priority than that of a general call terminal.

2. The radio base station according to claim 1, wherein the transmitter transmits the instruction, using the low priority call bearer through the router device.

3. The radio base station according to claim 2, wherein, when the transmitter transmits the instruction, the transmitter transmits, to the terminal, an instruction that causes the terminal to cut-off connection between the priority call terminal and the router device.

4. The radio base station according to claim 1, wherein the transmitter transmits the instruction, using the priority call bearer.

5. The radio base station according to claim 4, wherein the transmitter transmits, to the priority call terminal, the instruction and also required information for performing communication directly using the priority call bearer.

6. The radio base station according to claim 4, wherein, when the transmitter transmits the instruction, the transmitter transmits, to the terminal, an instruction that causes the terminal to cut-off connection between the priority call terminal and the router device.

7. The radio base station according to claim 5, wherein, when the transmitter transmits the instruction, the transmitter transmits, to the terminal, an instruction that causes the terminal to cut-off connection between the priority call terminal and the router device.

8. The radio base station according to claim 1, wherein, when the transmitter transmits the instruction, the transmitter transmits, to the priority call terminal, an instruction that causes the priority call terminal to cut-off connection between the priority call terminal and the router device.

9. A router device capable o relay data between a terminal and a radio base station, the router device that:
receives, from the radio base station, an instruction that causes a priority call terminal to cut-off connection between the router device and the terminal when a transmission rate of data from the priority call terminal falls below a predetermined threshold value when the priority call terminal connects to the radio base station through the router device using a low priority call bearer; and
transmits the instructions to the priority call terminal,
wherein the low priority call bearer is established between the router device and the radio base station, and
wherein the priority call terminal has a higher priority than that of a general call terminal.

10. A terminal capable of directly connecting with a radio base station without connecting through a router device and connecting with the radio base station through the router device, the terminal comprising:
a transmitter that transmits, to the router device, an instruction that causes the router device to cut-off connection between the terminal and the router device when a transmission rate of data from the terminal falls below a predetermined threshold value when the terminal connects to the radio base station through the router device using a low priority call bearer,
wherein the low priority call bearer is established between the router device and the radio base station, and
wherein the terminal has a higher priority than that of a general call terminal.

11. The terminal according to claim 10, wherein the terminal notifies the radio base station or the router device which Radio Access Technology (RAT) is capable of being designated as a target to which the connection is to be switched.

\* \* \* \* \*